United States Patent [19]
Lemirande et al.

[11] Patent Number: 4,796,011
[45] Date of Patent: Jan. 3, 1989

[54] GATE OPERATOR WITH PERSISTANT, AUDIBLE WARNING SIGNAL

[75] Inventors: Rodger Lemirande, Riverview; James S. Amtmann, Farmington Hills, both of Mich.

[73] Assignee: Stanley Automatic Openers, Detroit, Mich.

[21] Appl. No.: 939,096

[22] Filed: Dec. 8, 1986

[51] Int. Cl.⁴ ........................ G05B 5/00
[52] U.S. Cl. ........................ 340/545; 318/266; 340/686
[58] Field of Search ........................ 340/545, 691, 540, 679, 340/654, 686, 527, 528, 309.15; 220/211; 318/446, 468, 484, 490, 266; 49/13, 29, 30, 324

[56] References Cited

U.S. PATENT DOCUMENTS

| | | | |
|---|---|---|---|
| 3,631,447 | 12/1971 | Sulat et al. | 340/679 X |
| 3,975,723 | 8/1976 | Bowling et al. | 340/686 X |
| 4,263,536 | 4/1981 | Lee et al. | 318/468 X |
| 4,364,003 | 12/1982 | Phipps | 318/266 X |
| 4,429,264 | 1/1984 | Richmond | 318/266 X |
| 4,533,905 | 8/1985 | Leivenzou et al. | 340/686 X |
| 4,546,845 | 10/1985 | Meyer et al. | 49/31 X |
| 4,563,625 | 1/1986 | Kornbrekke et al. | 318/603 |
| 4,564,791 | 1/1986 | Brickner | 318/266 X |
| 4,583,081 | 4/1986 | Schmitz | 340/686 X |

*Primary Examiner*—Joseph A. Orsino
*Assistant Examiner*—Anh Tran
*Attorney, Agent, or Firm*—Krass & Young

[57] ABSTRACT

An operator for a fence gate of the type which translates laterally on and in immediate parallel adjacent relationship to a section of stationary fence wherein the operator comprises an audible sounder for producing a warning signal in advance of and during the entirety of gate translation. A maximum run timer is also included for terminating gate motor drive and operation of the audible sounder.

8 Claims, 2 Drawing Sheets

GATE OPERATOR WITH PERSISTANT, AUDIBLE WARNING SIGNAL

FIELD OF THE INVENTION

This invention relates to operators for laterally translating gates and more particularly to an operator which produces a persistant, audible warning signal in advance of and during translation of the gate.

BACKGROUND OF THE INVENTION

It is known in the door control art to provide means for generating a brief audible warning substantially simultaneous with the closing of a subway door, elevator door or the like. See, for example, U.S. Pat. No. 4,546,845 to Meyer et al which discloses the use of an audible warning signal which sounds for a brief interval immediately prior to the closing of a train car door.

Train car doors, subway doors and elevator doors generally slide into an enclosure in the opening direction and, hence, represent little or no danger to adjacent persons. For this reason, the audible signal is operated only immediately prior to or simultaneous with activation of the doors in the closing direction.

An entirely different set of circumstances prevails in the case of a gate of the type which translates by rolling or sliding parallel to and immediately adjacent a section of stationary fence to open and close a break or opening in the fence. In this case, the "scissors action" of the exposed sliding or rolling gate relative to the immediately adjacent stationary fence section represents a continuous danger to adjacent personnel while the gate is translating in both the opening and closing directions. Moreover, the risk of injury along the adjacent section of stationary fence, a distance which may in some cases be on the order of 20 or 30 feet, is immediate as soon as the gate begins to translate and persists throughout the translation.

BRIEF SUMMARY OF THE INVENTION

The present invention is a gate operator specifically intended for use in combination with fence gates of the type in which a motive power source drives or translates a gate parallel to an adjacent section of stationary fence to open and close a gate, in which an audible warning signal is produced upon generation of a gate operation command, whether it be for an opening motion or a closing motion, and which audible signal precedes actual activation of the gate operator motor by a suitable interval of, for example, three to five seconds, and which audible signal persists throughout the term of gate translation.

In general, the invention is carried out through the combination of signal command generator means such as a radio transmitter, pushbutton switch, card reader activator, ground loop or the like to produce gate translation command signals, means for substantially immediately applying an activation signal to a sounder device which signal persists throughout translation of the gate, and means for applying an activation signal to the gate operator motor only after a predetermined delay which may be on the order of three to five seconds.

In the preferred form, the invention further comprises a maximum run timer which is activated upon receipt of a gate translation command and which, if a time period such as 90 to 160 seconds expires before a signal from a limit switch, pulse counter or other gate translation monitor is received, operates to extinguish the audible warning signal and shut off the operator motor.

DETAILED DESCRIPTION OF THE SPECIFIC EMBODIMENT

Figure 1:
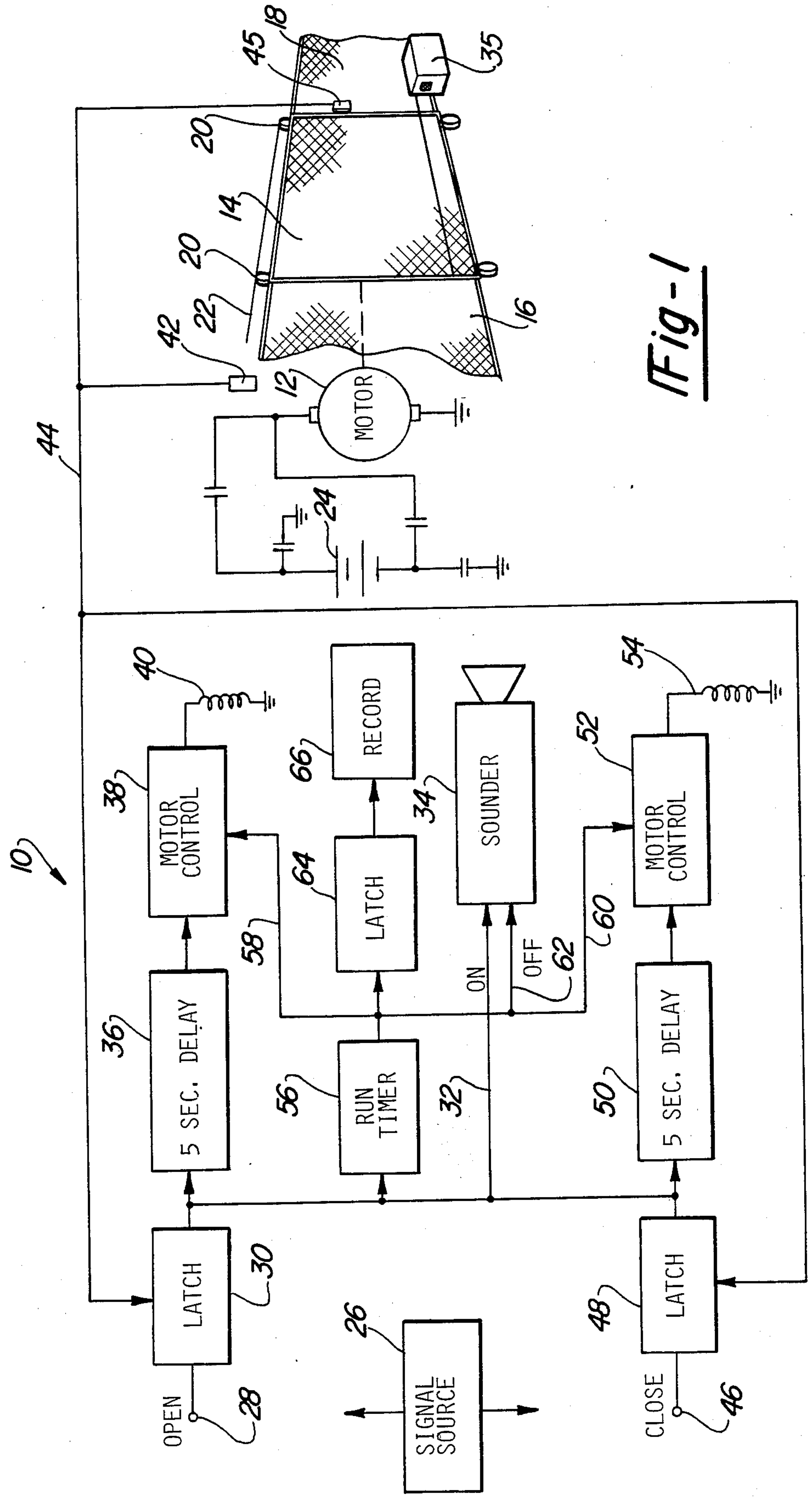
FIG. 1 is a block diagram of a gate operator incorporating the invention.

Referring to FIG. 1, a gate operator 10 is shown in combination with a reversable DC motor 12 which is connected to drive a translating gate 14 back and forth between opened and closed positions relative to adjacent fixed fence sections 16 and 18. Gate 14 is provided with suspension rollers 20 and cable 22 to cause the gate 14 to translate a distance which is normally approximately equal to its own lateral dimension in parallel and closely adjacent relationship to the stationary fence section 16.

The terms "gate" and "fence" as used herein, are intended to be broadly construed as the "fence" and may be constructed from a variety of materials ranging from wood slats to open twisted wire fencing and the "gate" itself may take a variety of forms ranging from twisted wire fencing in a tubular frame to more decorative and secure constructions. A typical example is a gate having a tubular steel frame and an open twisted wire interior construction, the adjacent stationary fence sections being of similar construction.

Reversible DC motor 12 is connected to a DC source 24, which may be the outlet of a rectified AC source, through a system of contacts $C_{O1}$, $C_{O2}$, $C_{C1}$ and $C_{C2}$. As hereinafter disclosed in greater detail, contacts $C_{O1}$ and $C_{O2}$ are simultaneously closed to form an energizing circuit through the motor 12 to run it in one direction and the remaining contacts $C_{C1}$ and $C_{C2}$ are simultaneously closed to activate the motor 12 to run in the opposite direction. The specific circuit is offered by way of illustration only as a variety of alternative electronic arrangements may be employed to selectively operate motor 12 in opposite directions.

Operator 10 comprises a source 26 of motor activation command signals which trigger operation of the motor 12 to either open or close the gate 14 by translation in parallel adjacent relationship to the stationary section 16. Signal source 26 may be a radio transmitter or a hard-wired switch such as a pushbutton by which a human may initiate selective translation of the gate 14. Alternatively, the signal source 26 may be a ground loop or pressure switch which automatically senses the presence of an automobile and initiates translation of the gate 14. Card readers and still other devices may also be employed. A common characteristic of the devices represented by signal source 26 is the production of a command signal, the duration which is effectively unrelated to the time required for the gate 14 to go through its full range of lateral translation.

The circuit of operator 10 further comprises a terminal 28 which receives commands directing the motor 12 to operate in the direction which opens the gate 14. Terminal 28 is connected to a latch circuit 30 which converts the brief or short term signal into a persistant signal which is applied by way of line 32 to the "ON" input of a sounder device which is capable of producing an audible warning signal. Sounder 34 is mounted on or immediately adjacent the gate such as for example in a box or housing 35. The sounder produces a persistant signal, preferably tuned for resonant response in the human ear canal, which alerts all nearby persons with ordinary hearing capacity that the gate 14 is either translating or about to begin translating.

The output of latch circuit 30 is also connected to a five second delay circuit 36, the output of which is connected to the motor control circuit 38 for the motor 12. The output of motor control circuit 38 is connected to a high voltage coil 40 which, when energized, closes the normally open contacts $C_{O1}$ and $C_{O2}$ energizing the motor 12 to run in the direction which opens the gate 14.

A limit switch 42 mechanically associated with the gate 14 produces a signal over line 44 which runs back to the latch circuit 30 to terminate the persistant signal when the gate 14 reaches a limit of travel. As will be apparent to those skilled in the gate operator art, the limit switch 42 is mechanically adjacent the position on stationary fence section 16 which is reached by the gate 14 in the full open position. Alternative and more sophisticated devices, such as pulse counters, may also be employed to produce a signal representing full translation of the gate 14. A second limit switch 45 performs a similar function when the gate 14 reaches the full closed position.

The circuit 10 further comprises a set of components to operate the motor 12 to close the gate 14. These include a command signal receipt terminal 46 upon which the "close" signal commands appear and a latch circuit 48 to convert the signal commands to persistant operating signals. The output of latch circuit 48 is connected to the sounder 34 by way of line 32 and also through a five second delay circuit 50 to a motor controlled circuit 52. The control circuit 52 operates a solenoid coil 54 which, when energized, closes the normally open contacts CC1 and CC2 to cause the motor 12 to operate in a direction opposite to that previously described. Limit switch 45 or its equivalent comes into play when the gate 14 reaches the full closed position by generating a signal which is applied to the latch circuit 48 to terminate the motor activation signal. As will be apparent to those skilled in the gate control art, the closure signal may come from various sources such as a ground loop, a photo cell or a timer.

The delay circuits 36 and 50 are non-reciprocal; i.e. although they delay the activation of the motor control circuits 38 and 52 for five seconds after the receipt of a command and the initiation of the operation of sounder 34, they do not delay the termination of motor operation when the latches 30 and 48 are released. The five second delay, although preferred, is given by way of example only as various delays from three seconds to seven or eight seconds may also be quite practical, the overall objective being to create a delay which is sufficient to allow bystanders and/or repairmen and the like to remove themselves and tools from proximity to either the translating gate 14 or a portion of the adjacent stationary fence 16 past which the gate 14 slides.

Circuit 10 further comprises a run timer 56 having an input connected to receive the outputs of both of the latch circuits 30 and 48. Run timer 56, when activated, produces an output after approximately 90 to 160 seconds, depending upon the length of the overall translation cycle or half cycle of gate 14; i.e. the run timer delay period is preferably substantially longer than the time it takes the gate 14 to translate from one limit to another under normal circumstances. The output of the timer 56, when activated, is connected to both of the motor control circuits 38 and 52 to operate as a "disable" or "reset" signal; i.e. an output from the run timer 56 will terminate operation of the motor 12 in either direction. Through this function, a component failure or obstruction which prevents the gate 14 from reaching the target limit of translation ultimately results in the shutdown of the motor 12 and, if desired, the operation of a latch circuit 64 to produce a record or indication via device 66 that a maximum run time event have occurred. Device 66 may simply be a light which turns on and remains on as long as the latch circuit 64 is operative. Alternatively, it may be a chart recorder with a time of day clock or some even more sophisticated instrumentality.

The output of the maximum run timer 56 is also connected by way of line 62 to the sounder 34 where it operates as an "OFF" signal to deactivate the sounder 34 in the event the motor 12 has continued to run beyond the normal closing or opening time due to one or more of the above-described conditions. Accordingly, the maximum activation time of the sounder 34 corresponds to the maximum run time established by the timer 56. As stated above, a duration of 90 to 160 seconds is typical.

Figure 2:
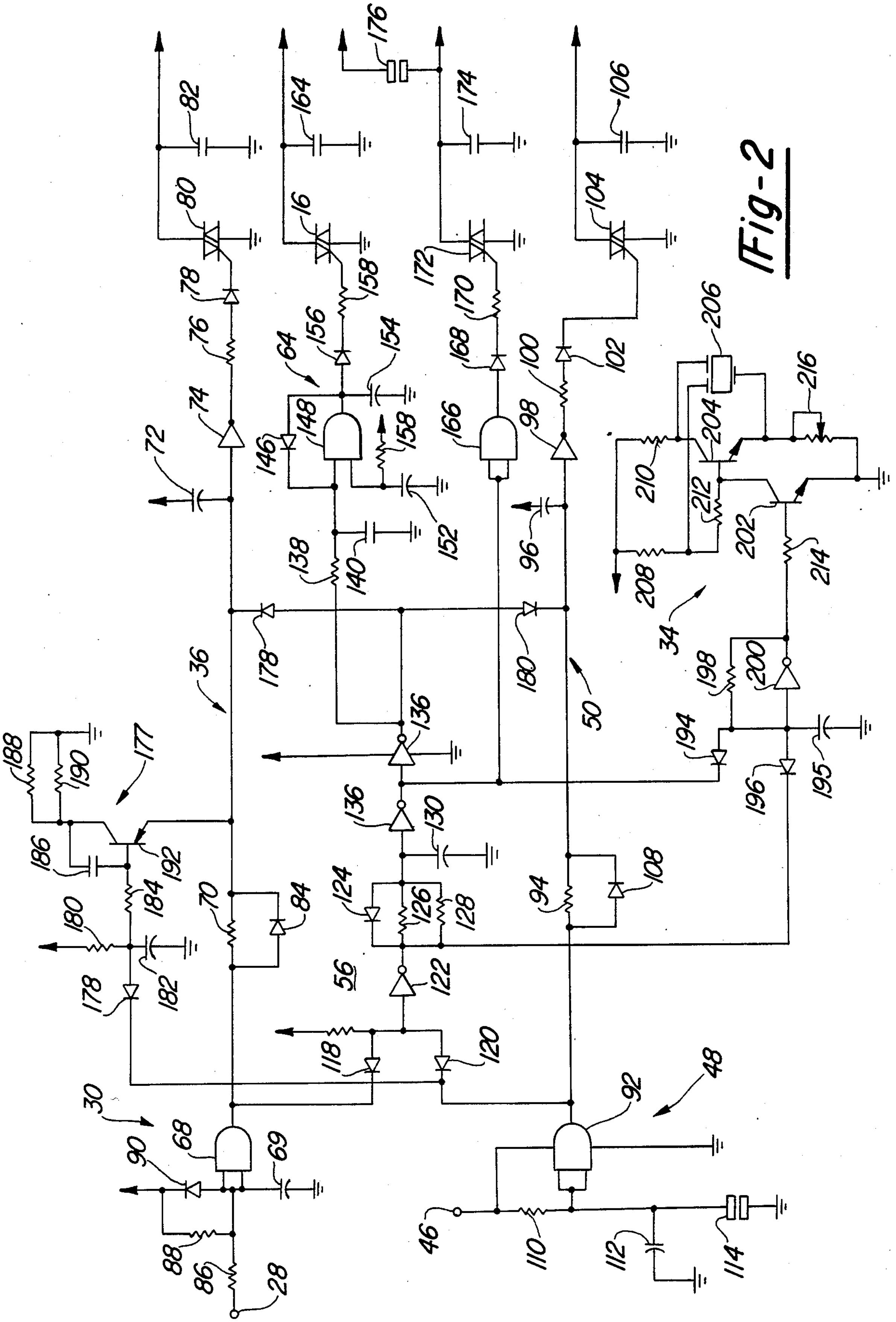
FIG. 2 is a schematic circuit diagram of the gate operator of FIG. 1.

FIG. 2 illustrates the schematic circuit details of the block diagram of FIG. 1. Although the circuit of FIG. 2 is illustrated for disclosure purposes as comprising discrete components, those skilled in the art will appreciate that the circuit may preferably be implemented, in whole or in part, as an integrated circuit. The reference characters from FIG. 1 are incorporated into FIG. 2 wherever practical.

The "open" signal input terminal 28 is shown connected through the latch 30 which consists primarily of the gate 68 and the capacitor 69 with an input from associated motor control circuit 28. The output of the capacitor is connected to the delay circuit 36 which consists primarily of a resistor 70 and a capacitor 72. The output of the delay circuit is connected through inverter 74, resistor 76 and diode 78 to the control input of the switch 80 having a capacitor 82 in the output circuit. A diode 84 is connected around the resistor 70 to provide a minimal reset time.

Latch 30 further comprises an input resistor 86 and a resistor 88 connected around a diode 90.

The "close" signal terminal 46 is connected through a latch 48 consisting primarily of a gate 92 and associated relay control to the five second delay 50 which consists primarily of a resistor 94 and a capacitor 96. The output of the delay circuit 50 is connected through an inverter 98, a resistor 100 and a diode 102 to the control input of the switch 104. Capacitor 106 is connected in parallel with the switch 104.

The outputs of both switches 80 and 82 go to appropriate solenoid coils which control the motor 12 in conventional fashion.

Diode 108 is connected around resistor 94. The latch 48 further comprises resistor 110, capacitor 112, and contacts 114, all connected in the input circuit to the gate 92. The output of gate 68 is connected to the run timer 56 through diode 118. The output of gate 92 is connected to the run timer 56 through diode 120. The run timer comprises an inverter 122, the parallel combination of resistors 126 and 128 shunted by diode 124, a capacitor 130, an inverter 134 and a second inverter 136. The output of the inverter 136 is connected through resistor 138 and capacitor 140 to a latch 64 and then to a recording circuit which, as previously described, may be considered optional. The latch comprises a diode 146, gate 148, resistor 150, and capacitors 152 and 154. The output of the latch is connected through diode 156 and resistor 158 to a switch 160 having an output circuit capacitor 164.

A second maximum run time output device consists of a gate 166 connected to receive the output of inverter 134, a diode 168 and a resistor 170 connected to the gate input of a switch 172 having an output circuit capacitor 174 and a set of contacts 176.

A circuit 177 is provided to reverse the direction of a translating gate 114 in the closing direction if an "open" signal is received on terminal 28 while the gate is closing. Circuit 177 effectively shunts resistor 70 so that there is minimal delay in activating the open function under these circumstances.

Circuit 177 comprises a transistor switch 192 having the emitter connected to the 5 second delay circuit, capacitor 72, resistor 70, and invertor 74. The base or control electrode of transistor 192 is connected to output of gate 48 through diode 178, and RC circuit consisting of resistor 180 and capacitor 182 and resistor 184. A capacitor 186 is connected between the base and collector of the transistor 192 and a pair of resistors 188,190 are connected between the collector and ground. These components effectively shunt resistor 70 during gate reversal providing a minimal reversal delay.

The sounder circuit 34 comprises diodes 194 and 196, of which diode 194 is connected to the output of the maximum run timer inverter 134 and diode 196 is connected to the output of inverter 122, also in the run timer 56. Diode 196 is connected to the base of the transistor 202 through an inverter 200 and a resistor 214 while diode 194 is connected through resistor 198 around the inverter 200. Transistor 202 is connected to stop oscillation of transistor 204 in the event the maximum run time has been exceeded. Bias resistors 208, 210 and 212 are employed along with a potentiometer 216 for adjusting the level of the signal applied to the transducer 206. Adjusting the potentiometer adjusts the level of the audio output.

Circuit element values for the circuit diagram of FIG. 2 are as follows:

| | |
|---|---|
| C 69 | 4.7 f |
| R 70 | 820K |
| C 72 | 4.7 uf |
| R 76 | 820 |
| C 82 | 0.1 f |
| R 86 | 4.7K |
| R 88 | 47K |
| R 94 | 820K |
| C 96 | 4.7 uf |
| R 100 | 820 |
| C 106 | 0.1 f |
| R 110 | 10K |
| C 112 | 4.7 f |
| R 126 | 470K |
| R 128 | 910K |
| C 130 | 330 f |
| R 138 | 100K |
| C 140 | 0.1 f |
| R 150 | 100K |
| C 152 | 1.0 f |
| C 154 | 10 f |
| R 158 | 820 |
| C 164 | 0.22 f |
| R 170 | 820 |
| C 174 | 0.1 f |
| R 180 | 330K |

-continued

| | |
|---|---|
| C 182 | 10 f |
| R 184 | 330K |
| C 186 | .01 f |
| R 188 | 270K |
| R 190 | 330K |
| C 195 | 1.0 f |
| R 198 | 330K |
| R 208 | 22K |
| R 210 | 510 |
| R 212 | 10K |
| R 214 | 22K |
| R 216 | 5K |

The final implementation of a gate operator employing the present invention may include other components such as lockouts, remote alarms, counters, and ratchet relays, all of which are known in the art. The ratchet relay, for example, is commonly used in gate and door operators to condition an input circuit so that alternate input signal occurence have opposite directional effects in initiating gate or door movement. The inclusion of a DC motor 12 in FIG. 1 is illustrative only, as AC motors may also be used and in many applications may be preferred.

What is claimed is:

1. For use in combination with a fence gate of the type which includes a motive power source for selectively translating the gate parallel to an adjacent section of stationary fence between opened and closed limits, respectively, an operator comprising:

means for producing normally short term commands for translation of the gate;

means responsive to receipt of said commands for producing persistant activation signals;

audible sounder means;

means for applying said activation signals to said sounder means to activate same;

means for applying said activation signals to activate said motive power source a predetermined time delay after application of said activation signals to said sounder means to produce translation of said gate; and means for terminating said activation signals upon said gate reaching a limit of travel.

2. An operator as set forth in claim 1 further including timer means for deactivating said sounder means after a predetermined time interval which is longer than the normal time period required for said gate to translate from one limit of translation to the other.

3. For use in combination with a fence gate of the type which, when driven by a motive power source, translates parallel and immediately adjacent to a section of stationary fence between opened and closed positions, and operator comprising:

means for producing commands for translation of said gate;

sounder means for producing an audible alarm;

first means responsive to a command to substantially immediately activate said sounder means;

second means responsive to a command to activate said motive power source after a delay of at least several seconds; and third means for simultaneously terminating operation of both said motive power source and said sounder means when said gate reaches one of said positions.

4. An operator as defined in claim 3 further including timer means to deactivate said motive power source after a time interval representing at least the interval normally required for said gate to translate from one limit to another.

5. An operator as defined in claim 3 further including timer means for terminating activation of said sounder means after a predetermined interval at least equal to the time period normally required for said gate to translate from one limit to another.

6. In combination:

a fence gate;

a section of stationary fence, said fence gate being mounted for translation parallel and immediately adjacent to said stationary fence section;

a motive power source for driving said gate relative to said fence section between first and second limits of travel;

means for producing short term commands for initiating translation of said gate;

means responsive to receipt of said commands for producing persistant activation signals;

audible sounder means;

means for applying the activation signals to said sounder means to activate same;

delay means for applying said activation signals to said motive power source a predetermined time delay after application of said signal to said sounder means; and means for terminating said activation signals upon said gate reaching a limit of travel whereby said motive power source and said sounder means simultaneously terminate operation.

7. The combination defined in claim 6 further including a maximum run time for deactivating both said sounder means and said motive power source a predetermined time period after activation of said motive power source at least equal to the time normally reuqired for said gate to translate from one limit to another.

8. For use in combination with a fence gate of the type which includes a motive power source for selectively translating the gate parallel to an adjacent section of stationary fence between opened and closed limits, respectively, and operator comprising:

first means for prodicing normally short term commands for translation of the gate;

latch means responsive to said receipt of said commands for producing persistant activation signal;

audible sounder means;

means for applying said activation signals to said sounder means to activate same;

delay means connected between said latch means and said motive power source and responsive to the initiation of said activation signals to activate said motive power source after a delay of at least several seconds but responsive to the termination of said activation signals to substantially immediately deactivate said motive power source; and means for terminating said activation signals upon said gate reaching a limit of travel.

* * * * *